United States Patent [19]

Druecker et al.

[11] Patent Number: 4,907,007

[45] Date of Patent: Mar. 6, 1990

[54] MOUNT AND MAGNETIC FIELD PROBE FOR NAVIGATING A MOTOR VEHICLE

[75] Inventors: Gerhard Druecker, Neuhausen; Heinz-Georg Burghoff, Reichenbach; Peter Haeussermann, Backnang; Gero Wuttke, Regensburg; Torsten Schlemmer, Munich, all of Fed. Rep. of Germany

[73] Assignee: Siemens Aktiengesellschaft, Berlin and Munich, Fed. Rep. of Germany

[21] Appl. No.: 30,360

[22] Filed: Mar. 26, 1987

[30] Foreign Application Priority Data

Mar. 26, 1986 [DE] Fed. Rep. of Germany ....... 3610336

[51] Int. Cl.$^4$ ............................................. H01Q 1/10
[52] U.S. Cl. ..................................... 343/715; 343/720; 343/903; 324/261
[58] Field of Search ............... 343/901, 903, 715, 894, 343/709, 713, 720, 878, 880, 883, 888, 889, 900; 242/54 A; 324/260, 261

[56] References Cited

U.S. PATENT DOCUMENTS

| 1,910,023 | 5/1933 | Leib | 343/889 |
|---|---|---|---|
| 2,095,588 | 10/1937 | Bellini | 343/869 |
| 3,158,865 | 11/1964 | McCorkle | 343/883 |
| 3,287,549 | 11/1966 | Lantery | 343/901 |
| 3,318,560 | 5/1967 | Garrette et al. | 343/901 |
| 3,331,234 | 7/1967 | Eichweber | 73/1 |
| 3,380,062 | 4/1968 | George | 343/903 |
| 3,495,261 | 2/1970 | Lastinger et al. | 343/883 |
| 4,037,328 | 7/1977 | Kuehn et al. | 33/349 |
| 4,062,156 | 12/1977 | Roth | 343/903 |
| 4,176,360 | 11/1979 | Leavy et al. | 343/880 |
| 4,365,237 | 12/1982 | Knight | 343/894 |
| 4,523,197 | 6/1985 | Imazeki et al. | 343/901 |
| 4,591,868 | 5/1986 | Cusey et al. | 343/903 |
| 4,649,398 | 3/1987 | Yamamoto et al. | 343/903 |
| 4,722,282 | 2/1988 | Synofzik et al. | 343/888 |

FOREIGN PATENT DOCUMENTS

| 1040091 | 10/1958 | Fed. Rep. of Germany | 343/901 |
|---|---|---|---|
| 455164 | 10/1936 | United Kingdom | 343/883 |

Primary Examiner—Rolf Hille
Assistant Examiner—Michael C. Wimer
Attorney, Agent, or Firm—Hill, Van Santen, Steadman & Simpson

[57] ABSTRACT

A magnetic field probe is secured to a probe capsule at a probe carrier which can be lowered into the body of a motor vehicle by the probe carrier. The probe carrier is preferably a telescoping element having an additional antenna function.

12 Claims, 3 Drawing Sheets

MOUNT AND MAGNETIC FIELD PROBE FOR NAVIGATING A MOTOR VEHICLE

BACKGROUND OF THE INVENTION

1. Field of the Invention

The invention relates generally to a mount for a magnetic field sensor and, more particularly, to mounting such sensor at a motor vehicle.

2. Description of the Related Art

What is known as "dead reckoning navigation" has been used for a long time to determine the position of vehicles, wherein the path distance and the direction of travel of the motor vehicle is constantly measured during travel. The travel direction of the motor vehicle is usually identified by measuring the earth's magnetic field by the use of a magnetic field probe or sensor. Stray magnetic fields have a disturbing effect on the measurement of the earth's field direction, many of the stray fields being generated by the vehicle itself. For example, body portions of the vehicle effect the field measurement, as well as magnetic fields arising as a result of electrical currents within the vehicle., In European Patent Application No. 0,067,357 it is disclosed that misdirection caused by stray fields can be minimized by careful selection of the mounting location of a magnetic field probe on a vehicle. To this end, the magnetic field probe is mounted on a probe carrier at a distance from the body of the vehicle. The probe carrier and the magnetic field probe attached thereto, however, are jeopardized in their exposed position. For example, the mount and/or the magnetic field probe can be damaged as the vehicle goes through a car wash.

SUMMARY OF THE INVENTION

An object of the present invention is to provide a probe carrier and magnetic field probe for use in navigation of a motor vehicle which avoids jeopardizing the probe carrier and magnetic field probe.

This and other objects are achieved in a magnetic field probe carrier which can be lowered into the vehicle body. To this end, the probe carrier can be formed to extend into and out of the body. Preferably, however, the probe carrier is either manually insertable and withdrawable or automatically insertable and extendable with respect to the vehicle body.

The probe carrier includes a separator, or spacer, which insures that the magnetic field probe maintains a required minimum distance from the motor vehicle body. A probe capsule is secured to the separator, the magnetic field probe being accommodated within the probe capsule to protect the magnetic field probe.

Since the probe capsule and the separator can represent a source of disturbances during measurement of earth's magnetic field, the materials used to form the probe capsule and the separator have no ferromagnetic or ferrimagnetic properties. In particular, the materials have a negligible magnetic remanence so that disturbing magnetic fields which arise due to the remanence are avoided. In an exemplary embodiment, the separator and/or the probe capsule are formed of brass or aluminum, although plastic can also be used.

Since the device is presented with mechanical vibrations and mechanical stresses, the shape and/or the material of the probe carrier is selected to provide adequate stiffness and stability. This largely avoids measuring errors due to movement of the magnetic field probe.

The shape of the probe capsule depends on the type and dimensions of the magnetic field probe used. In one embodiment, the probe carrier is in the shape of an extension arm or boom on the separator. The three-dimensional position of the extension arm is determined by the extension arm being attached to the separator in a fully mobile fashion, such as by a lockable articulation, so that the magnetic field probe can be adjusted to an optimum position with respect to the longitudinal and transverse axis of the vehicle.

The separator for the probe carrier is preferably formed as a telescoping means including at least one telescope element. The telescope means is guided in a guide part in anti-twist fashion so that the alignment of the magnetic field probe does not change relative to the vehicle axis. The antitwist protection of the telescope means in the guide part is achieved by adapting the outer geometrical shape of the telescope means to the guide part so that twisting of the telescope means in the guide part is not possible. For example, the contour of the outermost telescope element and the appertaining contour of the guide part include parallel planar surfaces that prevent twisting of the outermost telescope element relative to the guide part. Alternately, a spring/groove system, or key/keyway system, provides anti-twist guidance of the outermost telescope element in the guide part. The guide part itself is attached to the body of the vehicle in anti-twist fashion.

A drive system to move the probe carrier between extended and withdrawn positions is also provided. The drive system can be either pneumatically, hydraulically, or electromechanically driven, such as through the use of an electric motor and a transmission means.

It is advantageous to provide position sensors to determine whether the probe carrier has reached a final position, whether the probe carrier is in a final extended position or a final withdrawn position. The position sensor in one embodiment operates in noncontacting fashion by inductive or electro-optical means, or alternately is simply a mechanical switch. The position sensor identifies the final position when the telescope means is extended to thereby shut off the drive system when the final position is reached. Furthermore, the position sensor is preferably connected to supply information regarding movement of the probe carrier or telescope means to an electronic control. For example, a microprocessor control system evaluates the signal from the position sensor and reports the respective position to the driver of the vehicle, such as by a display. Arbitrary stop positions during extension and withdrawal are also detected and selected with the assistance of the position sensors.

It is preferred to include at least one locking means for fixing the probe carrier in place after it has reached a final position. The locking means mechanically retains the position of the probe carrier.

In embodiments where the probe carrier is a telescoping means having a plurality of telescope elements retractable into one another, a coupling between a drive system and the telescoping means is advantageous, particularly when individual telescope elements of the telescoping means are to be moved separately from others of the telescope elements.

A particular advantage of the present invention is that the probe carrier can also serve as an antenna. When the telescope means is formed of a plurality of telescope elements used as the probe carrier, movement of the telescope element is based roughly on the following pattern: when the ignition of the motor vehicle is turned on, that portion of the telescope means carrying the extension arm having the magnetic field probe is run out, or extended, so that the direction identification function is assured. In addition, when a radio in the motor vehicle is turned on, additionally provided telescope elements are run out by the drive system to perform the antenna function. The reverse operation, i.e. withdrawal, ensues when the radio and the ignition are turned off.

DESCRIPTION OF THE PREFERRED EMBODIMENTS

Figure 1:
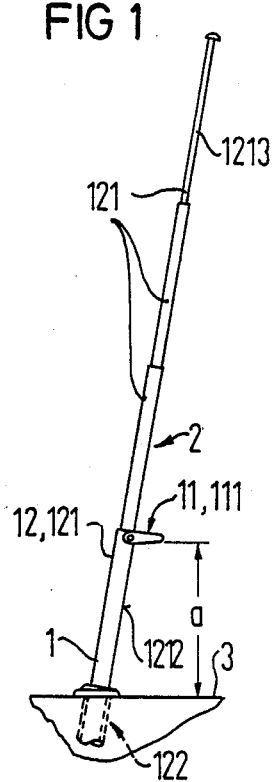
FIG. 1 is a side elevational view of an extended probe carrier according to the principles of the present invention.
Figure 2:
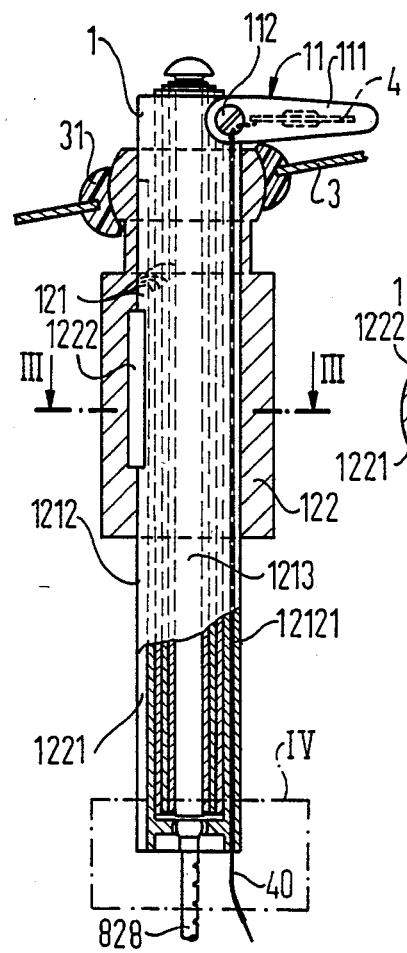
FIG. 2 is an enlarged longitudinal cross section of the probe carrier of FIG. 1 shown in retracted position.
Figure 3:
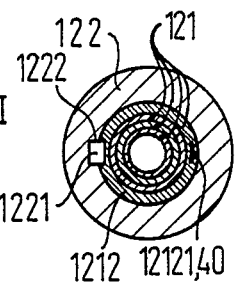
FIG. 3 is a cross section along line III-III of FIG. 2 through the retracted probe carrier.

In FIGS. 1, 2, and 3, a probe carrier 1 is shown formed of a separator 12 in the form of a telescoping means and having a probe capsule 11 within which a magnetic field probe 4 is accommodated. The telescoping unit 2 is formed of four telescope elements 121 of which an outermost telescope element is referenced 1212 and an innermost telescope element is referenced 1213. The probe capsule 11 is accommodated within an extension arm 111 which is disposed at an end of the outermost telescope element 1212. When the outermost telescope element 1212 is run out, or extended, as shown in FIG. 1, a distance a is provided between the extension arm 111 and a vehicle body 3. The telescoping separator means 12 is guided in anti-twist fashion in a guide part 122 by its outermost telescope element 1212. With the assistance of a set screw 112, vertical adjustment around a horizontal axis is provided for the magnetic field probe 4 within the extension arm 111 so that the magnetic field probe 4 is aligned parallel to the vehicle axis.

Anti-twist protection about the longitudinal axis of the concentric telescope means 12 is achieved by a spring and groove, or key and keyway, system. To that end, the outermost telescope element 1212 has an elongated guide groove or channel 1221 into which fits a fit spring, or key, 1222 of the guide part 122 as the telescope means is run out and retracted. The key 1222 and channel 1221 are seen clearly in FIG. 3. The guide part 122 is attached to the body 3 of the motor vehicle in an anti-twist fashion on the basis of its shape. A rubber seal 31 is disposed between the body 3 and the guide part 122. Leads 40 of the magnetic probe 4 are accommodated within a cable channel 12121 in the wall of the outermost telescope element 1212.

Figure 4:
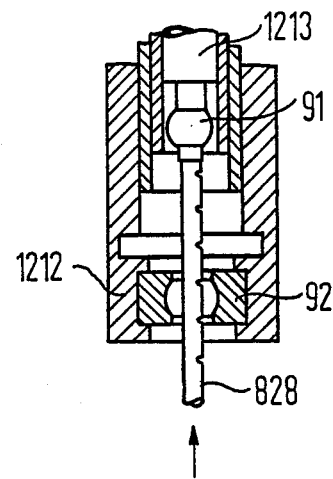
FIG. 4 is an enlarged partial cross section of the region IV of FIG. 2, although moved to a different position.

As shown in section IV of FIG. 2, the outermost telescope element 1212 is coupled to the innermost telescope element 1213 by a coupling. The coupling elements are shown separated in FIG. 4. The innermost telescope element 1213 includes a spherical latch element 91, while the outermost telescope element 1212 includes a concentric latch means 92, preferably in the form of a rubber ring, mating therewith. The rubber ring 92 is seated in a concentric channel of the inside wall of the outermost telescope element 1212, and more particularly, at the lower end thereof. The spherical latch element 91 fits into the latch ring 92 to releasably link the innermost and outermost elements together. The latch element 91 is also connected to a nylon pull 828.

Figure 5:
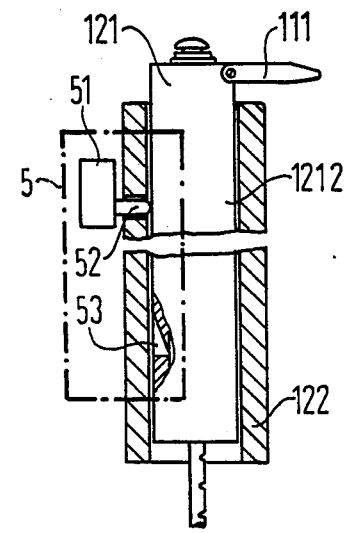
FIG. 5 is a reduced longitudinal cross section similar to the view of FIG. 2 and including a position sensor.

In FIG. 5, a position sensor 5 is used to indicate when the final extension position of the outermost telescope element 1212 has been reached. The position sensor 5 includes a microswitch 51 whose switch function is triggered by a switch ram 52. During run out, or extension, movement of the outermost telescope element 1212, the switch ram 52, which is rounded off at its head end, slides into a groove 53 of increasing depth which is provided in the wall of the outermost telescope element 1212. The switch ram 52 which is seated on a spring, or otherwise biased, traverses a path which triggers the contact of the microswitch 51. The microswitch 51 thereby switches off the drive system to stop the run out, or extension, motion of the outermost telescope element 1212.

Figure 7:
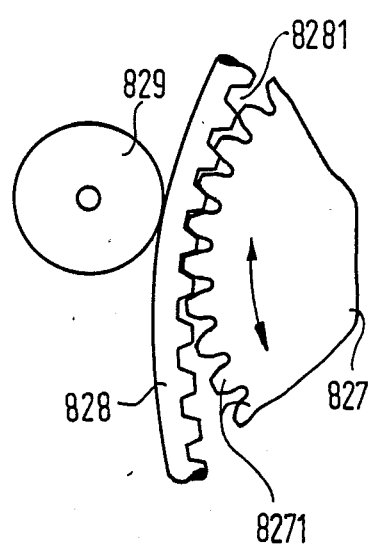
FIG. 7 is an enlarged elevational view of a portion VII from FIG. 6 of the drive system.
Figure 6:
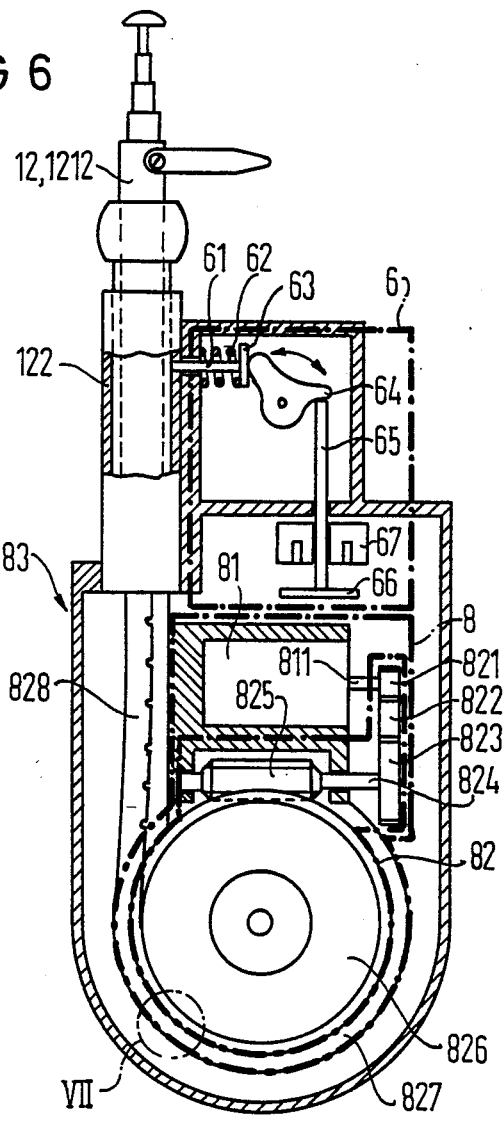
FIG. 6 is a longitudinal cross section through the probe carrier and a drive system therefor, according to the present invention.

FIG. 6 shows a drive system 8 for the telescope means and a locking means 6 for fixing the outermost telescope element 1212 in place. The overall arrangement is provided in a housing 83. The drive system 8 is formed of a low stray field electric motor 81 on whose shaft 811 a motor gear 821 is seated. The motor gear wheel 821 is connected to a gear wheel 823 in a non-positive fashion through the use of a toothed belt or timing belt 822. The toothed belt 822 is seated on a transmission shaft 824 which is rigidly connected to a worm member 825. The worm member 825 meshes with an appertaining worm wheel 826, which in turn is connected to a take-up reel 827 for the nylon pull 828. The nylon pull 828 is an elongated semi-stiff member that is guided in a channel and has teeth 8281 on a longitudinal side which mates with the teeth 8271 of the take-up reel, shown in FIG. 7. The nylon pull 828 is driven by being guided in a constrained fashion between a capstan idler 829 and the take-up reel 827. As a result thereof, the rotational movement of the worm wheel 826 is converted into a linear motion of the nylon pull 828 so that the telescope means is extended and retracted, respectively.

During extension of the telescope means, the latch element 91 is situated in the latch ring 92, as shown in FIG. 1. As long as the outermost telescope element 1212 is being extended, there is low mechanical resistance which is not adequate to press the spherical latch element 91 out of the rubber ring of the latch means 92. Entrainment of all of the telescope elements 121 is thereby caused, so that the overall telescope means 12 is extended. When, during the extension movement, the outermost telescope element 1212 has reached its final extended position, it is stopped. In this position, the extension arm 111 having the magnetic field probe 4 is situated at an optimal low disturbance distance from the body 3. The extension motion can either be stopped in this position, so that the directional identification of the motor vehicle is functional through the use of the magnetic field probe 4, or the extension motion can be continued. When the drive system 8 of the telescope means continues to remain active, the latch element 91 is pressed out of the elastic latch ring 92 so that the telescope means 12 is completely extended, as shown in FIG. 1. Now the antenna function of the telescope means is also assured. A retraction motion is executed in an analogous fashion to that of the extension motion.

The lock mechanism 6 is formed of a solenoid 67 which attracts a disk armature 66 when current is applied thereto. As a result thereof, a lifter rod 65, which is rigidly connected to the disk armature 66, traverses a stroke path which is transmitted with the assistance of a deflection lever 64 to a lock pin 61 and a pressing disk 63. The stroke force, thus, opposes a coil spring 62. The deflection lock pin 61 engages into a bore in the outermost telescope element 1212. The outermost telescope element 1212 is, thereby, arrested in a position which is defined by the position of the bore in the telescope element. One or more such bores can be provided at various locations along the outermost element 1212.

Although other modifications and changes may be suggested by those skilled in the art, it is the intention of the inventors to embody within the patent warranted hereon all changes and modifications as reasonably and properly come within the scope of their contribution to the art.

We claim as our invention:

1. A mount including a magnetic field probe for measuring the magnetic field of the earth as a part of a navigation system of a motor vehicle, comprising:
   a probe capsule in which the magnetic field probe is accommodated;
   a separator on which said probe capsule is mounted, said separator being movable to an extended position to place the magnetic field probe at a predetermined distance from a body of the motor vehicle;
   drive means for moving said separator from said extended position to a lowered position at least partially disposed in the body of the motor vehicle; and
   at least one sensor mounted for contact with said separator to sense said extended position of said separator when the magnetic field probe is at said predetermined distance from the body of the motor vehicle.

2. A mount claimed in claim 1, further comprising:
   at least one lock mechanism mounted at a position to selectively fix said separator in the extended position.

3. A mount as claimed in claim 2, wherein said separator is formed of a telescope means for telescoping extension and including at least one telescope element, and further comprising:
   a guide part fastened in said body and connected to said telescope means to prevent displacement of the magnetic field probe from a predetermined position when said telescope means is in an extended position.

4. A mount including a magnetic field probe as a part of a navigation means of a motor vehicle, the magnetic field probe being arranged at a distance from a body of the motor vehicle, comprising:
   a probe capsule in which the magnetic field probe is accommodated;
   a separator on which said probe capsule is mounted, said separator being formed of a telescope means for telescoping extension including at least one telescope element;
   drive means for moving said telescope means from an extended position to a lowered position at least partially in the body of the motor vehicle;
   at least one sensor mounted at a position to identify a final position of said probe capsule;
   at least one lock mechanism mounted at a position operable to fix said probe capsule in a final position;
   a guide part fastened in said body and connected to guide said telescope means without twisting to prevent displacement of said magnetic field probe from a predetermined position when said telescope means is in an extended position;
   said telescope means including an outermost telescope element and at least an inner telescope element;
   said probe capsule being an extension arm that is adjustable about a horizontal axis and is attached to said outermost telescope element;
   said drive means coupled to said telescope means by a coupling; and
   leads connected to said magnetic field probe and accommodated within said outermost telescope element.

5. A mount as claimed in claim 4, further comprising:
   a spherical latch element, and
   a latch means selectively fastenable to said spherical latch element to form a coupling between selected ones of said telescope elements.

6. A mount as claimed in claim 4, wherein at least one part of said separator serves as an antenna.

7. A mount as claimed in claim 6, wherein said probe capsule is composed of a material belonging to the class of materials having nonferromagnetic or nonferrimagnetic properties.

8. A mount including a magnetic field probe as a part of a navigation means of a motor vehicle having a body, comprising:
   a probe capsule carrying said magnetic field probe at a distance from the body of the motor vehicle;
   a telescoping separator operable to selectively maintain said magnetic field probe at said distance from said body;
   means for lowering at least a portion of said telescoping separator into said body;
   a guide part in said body, said separator being guided in said guide part during lowering; and
   means for preventing twisting of said separator in said guide part.

9. A mount as claimed in claim 8, wherein said capsule encloses said magnetic field probe and is mounted on said telescoping separator.

10. A mount as claimed in claim 9, further comprising:
    means for adjusting said capsule to lie in a substantially horizontal plane.

11. A mount as claimed in claim 8, wherein said separator includes a telescoping antenna having inner and outer telescope elements, said magnetic field probe being mounted on said outer telescope element.

12. A mount as claimed in claim 11, further comprising:
    drive means for telescopically moving said inner and outer telescope elements of said antenna.

* * * * *